United States Patent [19]

Stone et al.

[11] 4,447,860

[45] May 8, 1984

[54] BACKLIGHTED INSTRUMENT CONSOLE FOR A TRACTOR

[75] Inventors: Lawrence J. Stone, Livonia; Richard J. Wells, Ferndale, both of Mich.

[73] Assignee: Massey-Ferguson Inc., Detroit, Mich.

[21] Appl. No.: 222,869

[22] Filed: Nov. 14, 1980

Related U.S. Application Data

[63] Continuation of Ser. No. 886,006, Mar. 13, 1978, abandoned.

[51] Int. Cl.³ ............................................. G01D 11/28
[52] U.S. Cl. ......................................... 362/30; 362/23; 362/61; 362/80; 362/249; D12/192; 180/90; 296/70
[58] Field of Search ....................... 362/23, 30, 80, 61, 362/249; D12/192; 180/90; 296/70

[56] References Cited

U.S. PATENT DOCUMENTS 3,867,623  2/1975  Widlund ............................... 362/30
4,328,532  5/1982  Smith .................................... 362/30

Primary Examiner—Stephen J. Lechert, Jr.
Attorney, Agent, or Firm—John C. Thompson

[57] ABSTRACT

An improved console for a tractor or the like, the console being of the type carrying various instrumentation and controls. The console includes a relatively thick support member provided with at least one generally flat surface surrounding a plurality of openings with which various light emitting devices are associated and at least one aperture covered by a support panel to which various controls may be secured. The outer surface of the support panel is in line with the surface and a translucent sheet having symbols printed thereon is secured to the surfaces and with the symbols overlying the light emitting devices in the openings.

5 Claims, 6 Drawing Figures

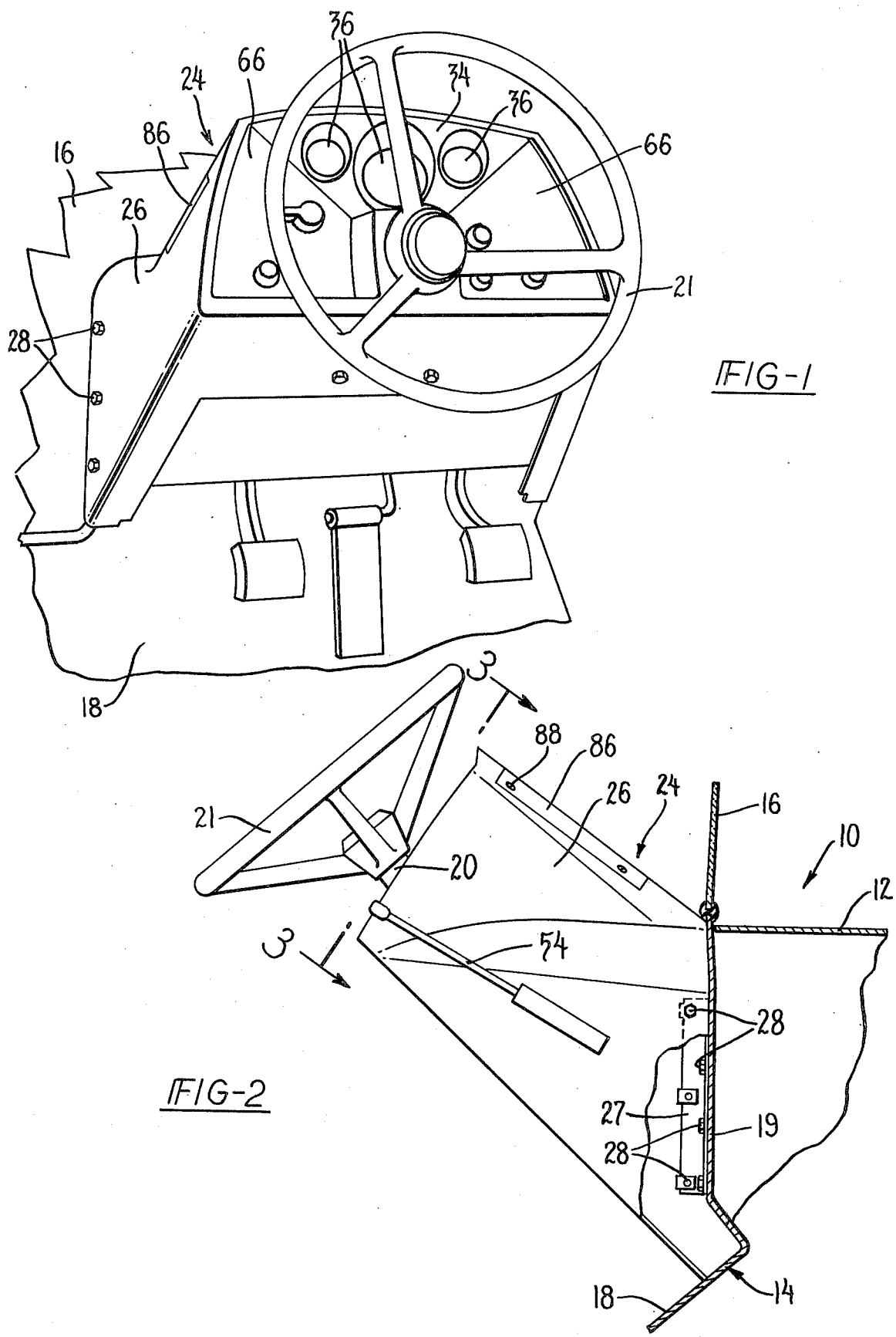

BACKLIGHTED INSTRUMENT CONSOLE FOR A TRACTOR

This is a continuation of application Ser. No. 886,006, filed Mar. 13, 1978, now abandoned.

TECHNICAL FIELD

The present invention relates generally to tractors or the like and more particularly to a backlighted instrument console for a tractor, the console being provided with various instrumentation and controls.

BACKGROUND ART

In the past it has been generally conventional to form the principal supporting member of a tractor console on which various instrumentation and controls are mounted from sheet metal components. The instrumentation and controls have been secured directly to the sheet metal by sheet metal fasteners or by clamping rings disposed to either side of the sheet metal. As the instrumentation for tractors and the like has increased, it has become more time consuming to assemble such consoles. In addition, such consoles frequently become dust catchers, which dust not only adversely affects the appearance of the console, but also adversely affects the operation of the instrumentation and controls. Furthermore, the accumulation of dust can work between mating parts thereby making disassembly for service more difficult. The sheet metal consoles have a further disadvantage in that the labor time to produce such consoles is relatively high.

DISCLOSURE OF INVENTION

It is an object of the present invention to provide an instrument console for a tractor or the like wherein the principal supporting member is formed of relatively thick foamed plastic, the member being provided with generally rearwardly facing surfaces with which various instrumentation and controls may be associated. Thus, the structural foam plastic is provided with a plurality of spaced apart openings with which light emitting devices of various types may be associated, the light emitting devices acting as warning or indicating lights. In addition, apertures may be provided surrounded by the generally flat surface, and support panels may be disposed over the apertures to which various control devices may be readily secured. A generally flat translucent sheet is provided which overlies the spaced apart openings and the support panels to prevent the entry of dust into the interior of the console and also to give the console an improved appearance.

BRIEF DESCRIPTION OF DRAWINGS

FIG. 1 is a perspective view of the backlighted instrument console of this invention.

FIG. 2 is a right side view of the console illustrated in FIG. 1.

BEST MODE FOR CARRYING OUT THE INVENTION

Figure 3:
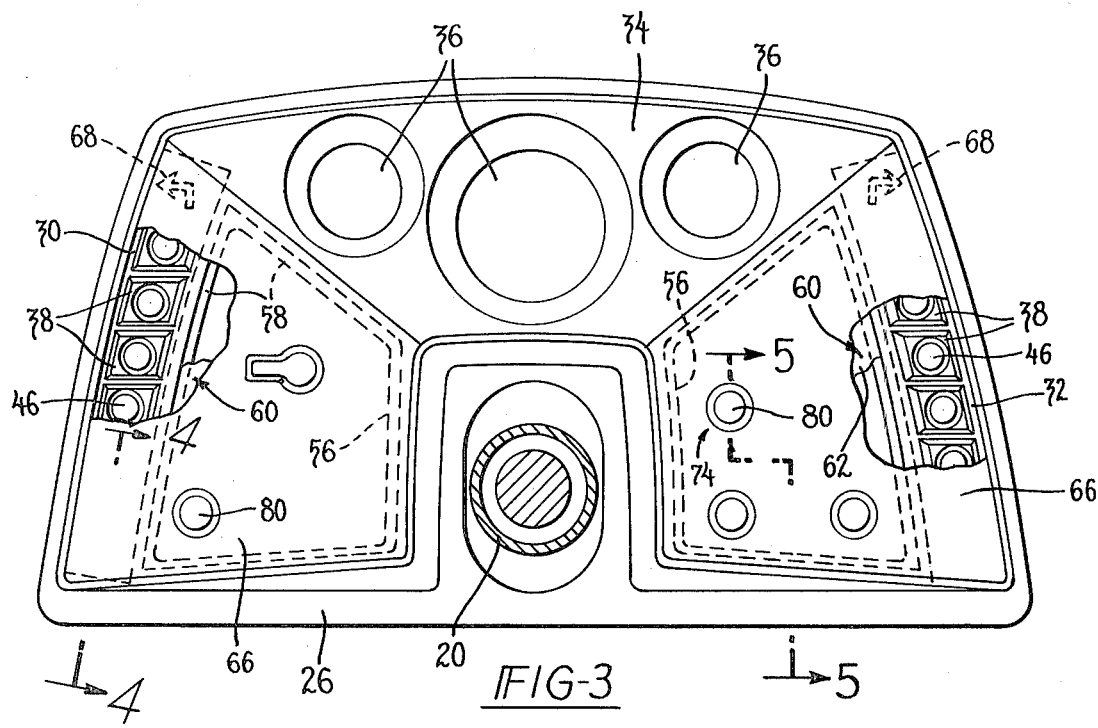
FIG. 3 is a view taken generally along the line 3—3 in FIG. 2.

Referring first to FIG. 2, a portion of a tractor is shown, the tractor being indicated generally at 10. The tractor is provided with a hood 12, and a cab indicated generally at 14, only a portion of the cab being illustrated and this including a windshield 16, floor 18, and firewall 19. A steering column 20 the upper portion of which is secured to the firewall 19, extends upwardly and rearwardly from the firewall and carries a steering wheel 21 at its upper end. The steering column and wheel are mounted generally along the plane defined by the longitudinal axis of the tractor.

According to this invention a novel console is provided, the console being indicated generally by reference numeral 24. The console includes a relatively rigid support member 26 which is secured to the firewall 19 by angle brackets 27 and fasteners 28. In practice the support member 26 is formed of a cast foamed structural plastic. However, other materials may be employed having similar properties.

The support member 26 is provided with spaced apart rearwardly facing generally flat first and second surfaces 30,32 (FIG. 3), disposed to either side of the steering column 20. In addition, a further flat surface 34 is disposed above the steering column which, in the embodiment illustrated, is provided with circular recesses 36 which receive dial like instruments such as a tachometer, ammeter, and/or oil pressure gauge. It should be obvious from the following that other information display devices could be utilized in the flat surface area 34, such as digital read-outs which could be covered by translucent sheets so as to give the same appearance to this area of the console as the side areas. However, dial type gauges are employed in the illustrated embodiment as it has been found that dust does not severely affect the performance of the dials since they are ordinarily extremely well sealed.

As the portions of the support member about the flat surfaces 30,32 are generally similar, references made to one of the flat surface areas would apply equally as well to the other flat surface area.

Figure 6:
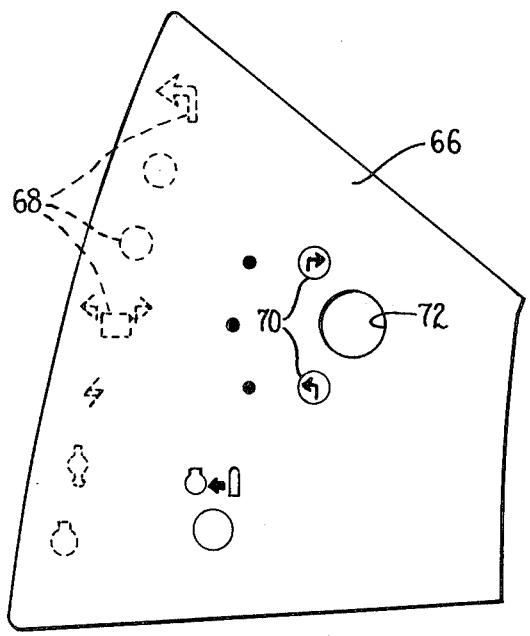
FIG. 6 is a view of one of the flat translucent sheets which forms a part of the instrument console of this invention.

It is a feature of the present invention to provide an essentially continuous flat surface in those areas associated with instruments and controls. Thus, in accordance with the principles of the present invention, translucent sheets (one of which is shown in FIG. 6) are disposed over the flat surfaces 30,32. Thus, the flat surfaces 30,32 form essentially a mounting surface for the translucent sheets.

Figure 4:
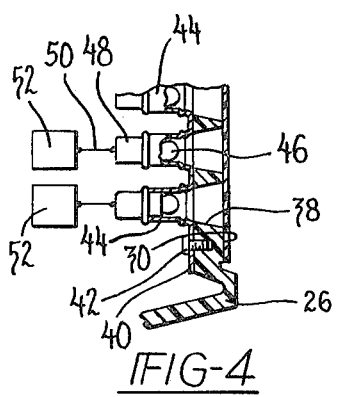
FIG. 4 is a section taken generally along the line 4—4 in FIG. 3.

It is a further feature of the present invention to provide a plurality of openings 38 along the periphery of each of the flat surface areas as best illustrated in FIGS. 3 and 4. A sheet metal member 40 is secured along the forward and downwardly facing surface of the support member 26 by fasteners 42, the member 40 being provided with a plurality of circular apertures in line with each of the openings 38, the apertures having cylindrical members 44 secured thereto by crimping or any other suitable method. Light emitting devices in the form of bulbs 46 are disposed within the cylindrical members 44 in association with the openings 38, there being one light emitting device for each of the openings 38. Each bulb 46 is carried by a socket member 48 which is secured within a cylindrical member 44 by a snap fit structure which is integral with the associated socket member 48. Each of the bulbs 46 can be considered to be a warning or indicating lamp and it is of course innerconnected by suitable electrical circuitry 50 with suitable switching means 52, to switch the light emitting device on and off at the appropriate times.

As is conventional, the console not only is provided with warning devices in the form of the various light emitting devices, but also supports various control devices. Such control devices, as for example the hand throttle 54, may be mounted directly on the console. Other control devices, those which are to be provided in the area of the flat surfaces 30,32, may be mounted in a different manner. To this end, each of the surfaces 30,32 is provided with an aperture 56, which is surrounded by a recessed lip 58 (which may be discontinuous). A generally flat support panel indicated generally at 60 overlies the recessed area and has a rear surface 62 which is in line with the adjacent surface 30,32. The support panel 60 is secured by peripheral fastening assemblies 64.

A printed flat translucent sheet 66 is bonded over each of the surfaces 30,32 and the rear surface 62 of the associated panel 60 in order to improve the appearance of the console, to provide for a surface which excludes dust from passing into the various light emitting devices and control assemblies (which will be described later), and also to provide various indicia. The translucent sheets 66 are of a type commercially available from the W. H. Brady Co. of Milwaukee, Wisconsin. Symbols or indicia 68 and 70 are printed on the undersurface of the sheets 66 in such a manner that the indicia 70 are visible at all times while indicia 68 are virtually invisible except when backlighted by one of the light emitting devices 46. Thus, that portion of the sheets 66 which carry the indicia 68 have an appearance which is generally referred to as a "dead front" appearance. By printing the indicia on the undersurface it will have improved wearing characteristics as it is protected from the elements. It should be obvious that those indicia 68 which are to be associated with the various light emitting devices 46 should be so positioned on the sheet 66 that when the sheet 66 is adhesively secured or bonded in place the indicia 68 will overlie those openings with which they should be associated.

Figure 5:
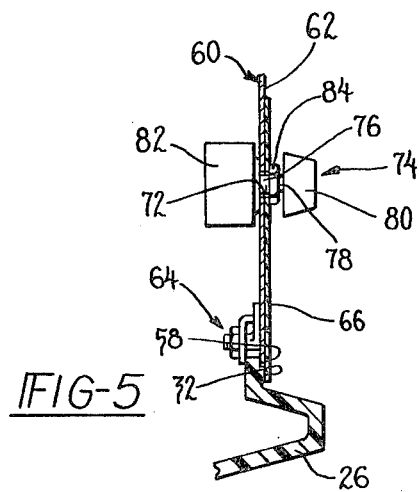
FIG. 5 is a section taken generally along the line 5—5 in FIG. 3.

Various control devices may be associated with the sheet 66, and to this end the sheet 66 may be provided with one or more apertures 72 which will correspond to an aperture in an associated support panel 60. Control knobs may be associated with each of the apertures in any desired manner, one example being shown in FIG. 5. In this example the control, which is indicated generally at 74, is provided with a threaded tubular member 76 which passes through the aperture 72 and the associated aperture in the panel 60, the threaded member 76 surrounding a rotatable shaft 78 to which a control knob 80 is secured. A portion of control housing 82, abuts one side of the panel 60, and a securing nut 84 is disposed on the threaded member 76 on the other side of the panel 60 and sheet 66 to secure the control member in place in a manner well known in the art. A clearance hole may be provided in the sheet 66 to permit the nut 84 to bear directly against the panel 60, however, it will be appreciated that at least a portion of the control knob 80 overlies the sheet 66.

It should be obvious from the foregoing that by employing the various novel features of this invention a console can be provided which can be manufactured with less labor, which has a better appearance, and which can isolate various indicating and control devices from dust, etc.. However, in order to service these various devices, it is necessary to provide access to the front. Therefore, a removable cover plate 86 is disposed over a corresponding aperture in the support member 26, the cover plate being secured in place by fasteners 88.

What is claimed is:

1. In combination with a tractor provided with a cab having a forward portion, a backlighted instrument console comprising:
   a relatively fixed support member secured to the forward portion of the cab and provided with a rearwardly facing generally flat surface having a plurality of spaced apart openings and a relatively large aperture extending through said support member;
   a plurality of selectively operable light emitting devices;
   means mounting the light emitting devices in association with said openings, there being only one light emitting device associated with each of the openings;
   a generally thin flat support panel associated with said support member with a portion of the panel extending across said aperture, the panel being mounted in such a manner that its rear surface lies in the same plane as the generally flat surface of said support member;
   peripheral fastening means securing the thin flat support panel to the support member;
   a translucent sheet having a plurality of symbols, said sheet being secured to said support member with one side of the sheet being adjacent said surfaces of the support member and the support panel, and with the symbols overlying said openings; and
   a control secured to said support panel, at least a portion of the control overlying said sheet, another portion of the control passing through said sheet and panel.

2. A backlighted instrument console for a tractor or the like comprising:
   a relatively thick support member provided with a rearwardly facing generally flat surface having a plurality of spaced apart openings and a relatively large aperture extending through said support member;
   a plurality of selectively operable light emitting devices;
   means mounting the light emitting devices in association with said openings, there being only one light emitting device associated with each of the openings;
   a generally thin flat support panel associated with said support member with a portion of the panel extending across said aperture, the panel being mounted in such a manner that its rear surface lies in the same plane as the generally flat surface of said support member;
   peripheral fastening means securing the thin flat support panel to the support member;
   a translucent sheet having a plurality of symbols, said sheet being secured to said support member with one side of the sheet being adjacent said surfaces of the support member and the support panel, and with the symbols overlying said openings; and
   a control secured to said support panel, at least a portion of the control overlying said sheet, another portion of the control passing through said sheet and panel.

3. The backlighted instrument console for a tractor set forth in claim 2 in which said relatively thick support member surrounds a portion of a steering column.

4. The backlighted instrument console for a tractor set forth in claim 3 wherein the relatively thick support member is provided with a second generally flat surface, the first mentioned generally flat surface and the second flat surface being disposed on opposite sides of said steering column, and the second generally flat surface having a plurality of spaced apart openings and a relatively large aperture extending through said support member.

5. The backlighted instrument console for a tractor set forth in claim 2 in which said plurality of spaced apart openings are disposed along a peripheral edge of the generally flat surface.

* * * * *